US009432380B2

(12) United States Patent
Margalit et al.

(10) Patent No.: US 9,432,380 B2
(45) Date of Patent: Aug. 30, 2016

(54) NETWORK CONTROL SECURITY (71) Applicant: EMPIRE TECHNOLOGY DEVELOPMENT LLC, Wilmington, DE (US)

(72) Inventors: Mordehai Margalit, Zichron Ya'akov (IL); Yoav Wechsler, Karnei Shomron (IL); Vlad Grigore Dabija, Mountain View, CA (US)

(73) Assignee: Empire Technology Development LLC, Wilmington, DE (US)

( * ) Notice: Subject to any disclaimer, the term of this patent is extended or adjusted under 35 U.S.C. 154(b) by 142 days.

(21) Appl. No.: 14/492,938

(22) Filed: Sep. 22, 2014

(65) Prior Publication Data
US 2016/0087994 A1    Mar. 24, 2016

(51) Int. Cl.
G06F 7/04      (2006.01)
G06F 15/16     (2006.01)
G06F 17/30     (2006.01)
H04L 29/06     (2006.01)
H04L 12/725    (2013.01)

(52) U.S. Cl.
CPC .......... H04L 63/105 (2013.01); H04L 45/308 (2013.01)

(58) Field of Classification Search
CPC .................. H04L 63/105; H04L 45/308
See application file for complete search history.

(56) References Cited

U.S. PATENT DOCUMENTS

| 8,194,680 | B1* | 6/2012 | Brandwine | H04L 61/103 370/398 |
| 9,203,747 | B1* | 12/2015 | Brandwine | H04L 45/02 |
| 2003/0233540 | A1* | 12/2003 | Banerjee | H04L 12/185 713/153 |
| 2010/0130191 | A1* | 5/2010 | Li | H04L 12/24 455/423 |
| 2012/0300747 | A1* | 11/2012 | Westberg | H04W 36/0011 370/331 |
| 2013/0003745 | A1* | 1/2013 | Nishimura | H04L 12/4641 370/400 |
| 2013/0060922 | A1* | 3/2013 | Koponen | H04L 12/4633 709/223 |
| 2013/0124707 | A1* | 5/2013 | Ananthapadmanabha | H04L 49/3009 709/223 |

(Continued)

FOREIGN PATENT DOCUMENTS

JP     EP 2693708 A4 *  8/2015

OTHER PUBLICATIONS

"Solution Brief: SDN Security Considerations in the Data Center," Accessed at https://www.opennetworking.org/solution-brief-sdn-security-considerations-in-the-data-center, Accessed on Aug. 20, 2014, pp. 10.

(Continued)

Primary Examiner — Christopher Revak
Assistant Examiner — Vadim Savenkov
(74) Attorney, Agent, or Firm — Moritt Hock & Hamroff LLP; Steven S. Rubin, Esq.

(57) ABSTRACT

Technologies are generally described for systems, devices and methods effective to allow a network element to retrieve a control command. In some examples, a network controller device may associate an identifier with the control command. The network controller device may send the identifier and the associated control command over a first network with a first level of security to a computing device. The network controller device may send an activation signal to the network element over a second network with a second level of security different from the first level of security. The network controller device may send the identifier to the network element over the second network. The identifier may be effective to allow the network element to retrieve the control command.

20 Claims, 5 Drawing Sheets

(56) References Cited

U.S. PATENT DOCUMENTS

| | | | | |
|---|---|---|---|---|
| 2013/0194914 A1* | 8/2013 | Agarwal | H04L 45/245 | 370/225 |
| 2014/0194111 A1* | 7/2014 | Aso | H04W 4/001 | 455/419 |
| 2015/0163331 A1* | 6/2015 | Ni | H04L 43/028 | 709/224 |
| 2015/0249572 A1* | 9/2015 | Mack-Crane | H04L 45/38 | 709/222 |
| 2015/0261875 A1* | 9/2015 | Pignataro | G06F 17/30896 | 715/234 |
| 2015/0319094 A1* | 11/2015 | Brockbank | H04L 47/2483 | 370/216 |
| 2015/0381324 A1* | 12/2015 | Mirsky | H04L 1/24 | 370/241.1 |
| 2016/0050122 A1* | 2/2016 | Cortes Gomez | H04L 45/566 | 713/168 |
| 2016/0080263 A1* | 3/2016 | Park | H04L 49/35 | 370/392 |

OTHER PUBLICATIONS

Glen, L., "Can SDN Change Network Security?," Accessed at http://web.archive.org/web/20131102202418/http://www.inetu.net/about/server-smarts-blog/october-2013/can-sdn-change-network-security, Oct. 31, 2013, pp. 5.

Kreutz, D. et al., "Towards Secure and Dependable Software-Defined Networks," Proceedings of the second ACM SIGCOMM workshop on Hot topics in software defined networking, 2013, pp. 55-60.

* cited by examiner

NETWORK CONTROL SECURITY

BACKGROUND

Unless otherwise indicated herein, the materials described in this section are not prior art to the claims in this application and are not admitted to be prior art by inclusion in this section.

Software defined networks ("SDNs") may allow network control systems to be separated from operation of network elements. Network elements, such as routers, programmable switches, and/or computing devices, may send and receive network traffic. Network control systems may be programmed to control network traffic flow through network elements. In some examples, software defined networks may be able to quickly respond to changing network conditions in order to optimize network traffic flow.

SUMMARY

In some examples, methods to allow a network element to retrieve a control command are generally described. In some examples, the methods may include associating, by a network controller device, an identifier with the control command. In various other examples, the methods may further include sending, by the network controller device, the identifier and the associated control command over a first network with a first level of security to a computing device. In some examples, the methods may further include sending, by the network controller device, an activation signal to the network element over a second network with a second level of security different from the first level of security. In various examples, the methods may further include sending, by the network controller device, the identifier to the network element over the second network. In some examples, the identifier may be effective to allow the network element to retrieve the control command.

In some examples, network communication systems are generally described. The network communication systems may include a network controller device. In some examples, the network communication systems may further include a computing device configured to be in communication with the network controller device over a first network with a first level of security. In some examples, the network communication system may further include a network element configured to be in communication with the network controller device and the computing device. In various examples, the network controller device may be effective to send an identifier and associated control command over the first network to the computing device. In some examples, the computing device may be effective to store the identifier and the associated control command in a memory of the computing device. In some examples, the network controller device may be further effective to send an activation signal to the network element over a second network with a second level of security different from the first level of security. In some further examples, the network controller device may be further effective to send a copy of the identifier to the network element over the second network. In some examples, the network element may be effective to, in response to receipt of the activation signal, send the copy of the identifier to the computing device. In various examples, the computing device may be further effective to, in response to receipt of the copy of the identifier, send the control command associated with the identifier to the network element.

In some examples, network controller devices are generally described. In some examples, the network controller devices may include a processor and a memory configured to be in communication with the processor and effective to store one or more instructions. In some examples, the processor may be effective to, in accordance with the one or more instructions, send an identifier and control command over a first network with a first level of security to a computing device. In various examples, the processor may be further effective to send an activation signal to a network element over a second network with a second level of security different from the first level of security. In some further examples, the processor may be effective to send a copy of the identifier to the network element over the second network. In some examples, the network element may be effective to receive the control command from the computing device.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. The aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems, devices, and computer program products related to network control security.

Briefly stated, technologies are generally described for systems, devices and methods effective to allow a network element to retrieve a control command. In some examples, a network controller device may associate an identifier with the control command. The network controller device may send the identifier and the associated control command over a first network with a first level of security to a computing device. For example, the network controller device may send the identifier and the associated control command over a secure network to a network communication manager. The network controller device may send an activation signal to the network element over a second network with a second level of security different from the first level of security. For example, the network controller device may send a ping to a network element, such as a router, over a software defined network. The network controller device may send the identifier to the network element over the second network. The identifier may be effective to allow the network element to retrieve the control command. In an example, authorizing the network element to retrieve control commands from a secure server may prevent a hacker from hijacking a network element by posing as a network controller and sending malicious commands directly to the network element.

Figure 1:
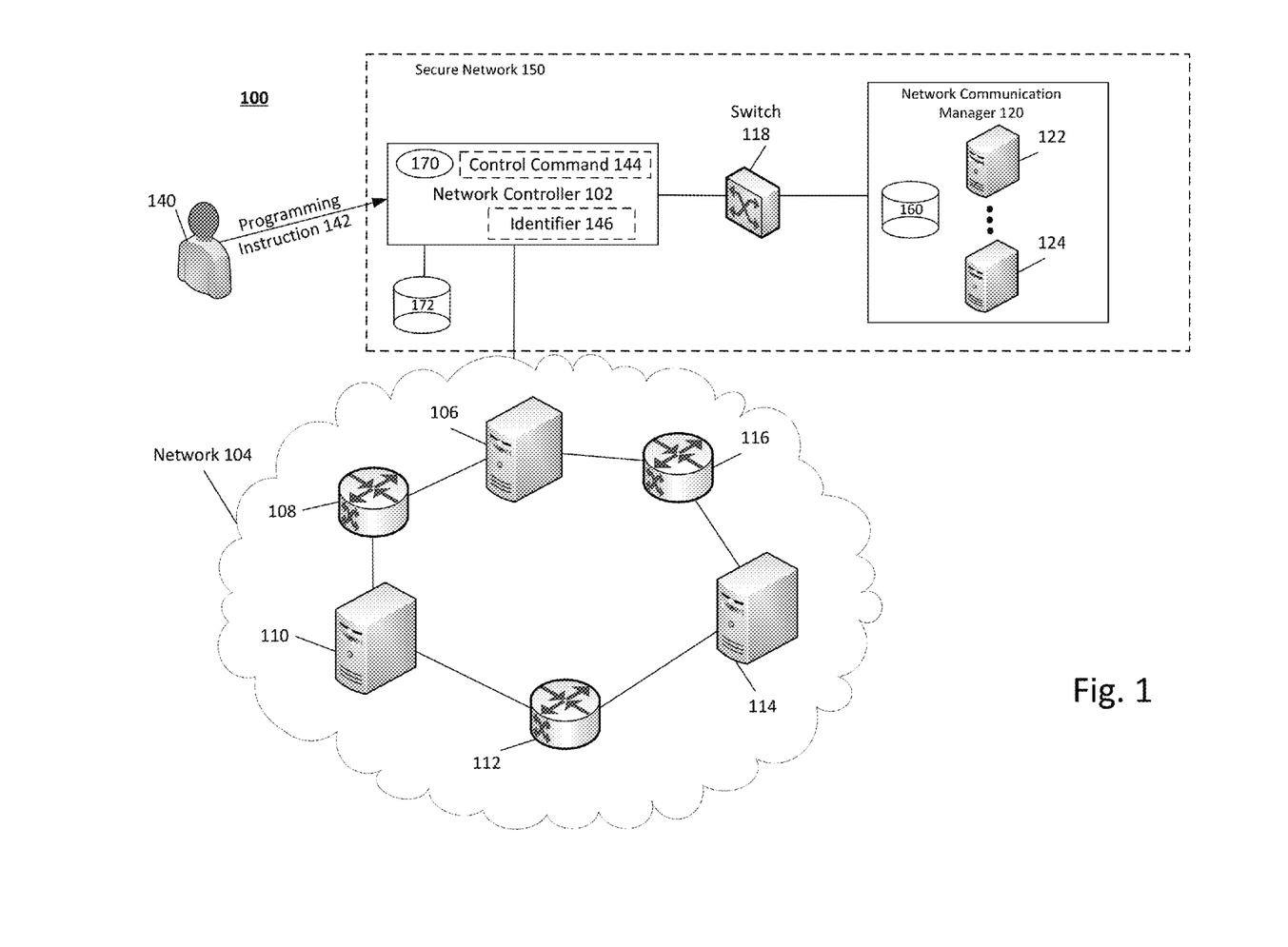
FIG. 1 illustrates an example system that can be utilized to implement network control security.

FIG. 1 illustrates an example system 100 that can be utilized to implement network control security, arranged in accordance with at least some embodiments described herein. System 100 may include a network controller 102, a network 104 (including network elements 106, 108, 110, 112, 114, and/or 116), and a network communication manager 120, all configured to be in communication with one another. In some examples, network controller 102, network 104, and/or network communication manager 120 may be arranged in a software defined network. Network elements 106, 108, 110, 112, 114 and/or 116 may include devices such as routers, programmable switches, computing devices and/or other pieces of hardware configured to be in communication with one another and configured to receive and transmit network traffic. Network elements 106, 108, 110, 112, 114 and/or 116 may be controlled through network controller 102. In some examples, network controller 102 may be programmed by an operator 140 to control network elements 106, 108, 110, 112, 114 and/or 116.

Network controller 102 may be, for example, a computing device, and may include a processor 170. In some examples, network controller 102 may be configured in communication with a memory 172. In various examples, memory 172 may store instructions used to implement network control security, as described below.

In an example, an operator 140 may program network controller 102 to make one or more changes to a network element, such as network element 116. Operator 140 may be authenticated and authorized to access network controller 102 and/or network communication manager 120. In the example, operator 140 may send programming instruction 142 to network controller 102. Programming instruction 142 may be effective to program network controller 102 to generate a control command 144. In some examples, programming instruction 142 may be configured to alter a characteristic of a software defined network. Control command 144 may be effective to configure one or more network elements (such as network elements 106, 108, 110, 112, 114, and/or 116) to take one or more actions related to a software defined network (such as, for example, network 104). In the current example, control command 144 may be effective to instruct network element 116 (which may be a router in the instant example) to change from a first routing algorithm to a second routing algorithm, or to change a flow of traffic in network 104. Network controller 102 may be effective to generate an identifier 146. Identifier 146 may be a code effective to identify control command 144. Network controller 102 may be effective to associate control command 144 with identifier 146.

Identifier 146 and associated control command 144 may be sent from network controller 102 to network communication manager 120. Network communication manager 120 may include one or more servers, such as server 122 and/or server 124, and a memory 160. Servers 122 and/or 124 may be configured to be in communication with memory 160. In some further examples, network communication manager 120 may be effective to communicate with network controller 102 and/or network 104 through a switch 118. In various examples, network controller 102, switch 118 and network communication manager 120 may be configured in a secure network 150. In some examples, secure network 150 may include a first level of security. For example, secure network 150 may include one or more security measured designed to prevent unauthorized access of devices configured in communication over secure network 150. In some examples, devices configured in communication through secure network 150 may be privileged to write to a memory of network communication manager 120. For example, network controller 102 may be privileged to write control command 144 to memory 160 of network communication manager 120. Conversely, devices which are not part of secure network 150 (e.g., network elements 106, 108, 110, 112, 114, and/or 116) may not be privileged to write to memory 160 of network communication manager 120.

In some further examples, computing elements within secure network 150 (such as, for example, network controller 102) may have access to write data to network communication manager 120 (including servers 122 and/or 124 and memory 160). Identifier 146 and associated control command 144 may be written to memory 160 by network communication manager 120. In some examples, identifier 146 and associated control command 144 may be associated as entries in a lookup table in memory 160.

As is explained in further detail below, network controller 102 may send identifier 146 and associated control command 144 to network communication manager 120 so that a network element may retrieve control command 144 from network communication manager 120 in a secure manner. For example, network controller 102 may send an activation signal and a copy of identifier 146 to network element 108 over network 104. In some examples, network 104 may include a different level of security relative to secure network 150. Network element 108 may send identifier 146, or a copy of identifier 146, to network communication manager 120. Network communication manager 120 may authorize network element 108 to retrieve control command 144 based on receipt of identifier 146, or a copy of identifier 146, from network element 108. As will be discussed in further detail below, in response to receipt of the activation signal, network element 108 may retrieve control command 144 from network communication manager 120 by sending identifier 146, or a copy of identifier 146, to network communication manager 120.

Figure 2:
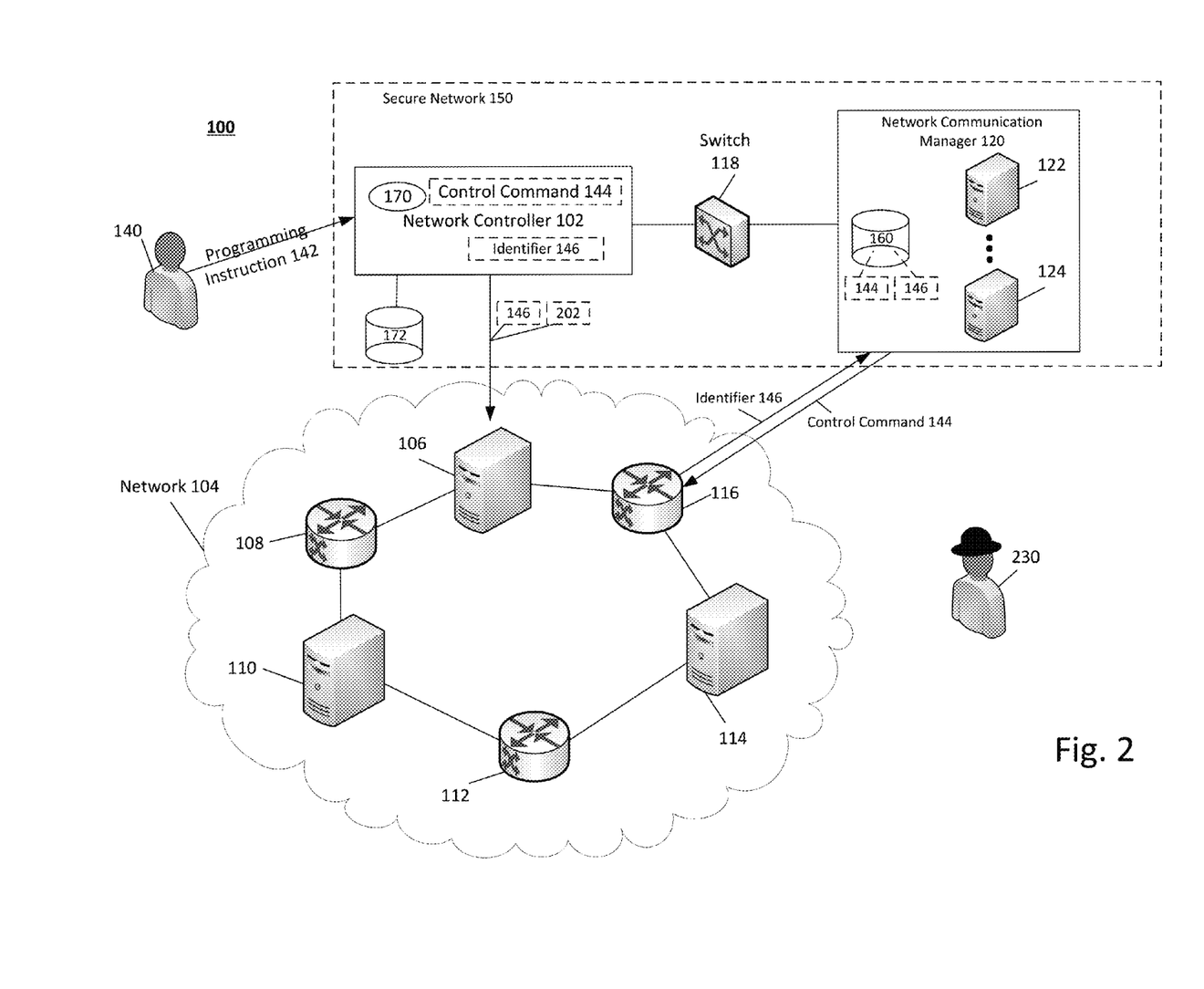
FIG. 2 depicts the example system of FIG. 1, with additional details relating to a network communication manager.

FIG. 2 depicts example system 100 of FIG. 1, with additional details relating to a network communication manager, arranged according to at least some embodiments described herein. Those components in FIG. 2 that are labeled identically to components of FIG. 1 will not be described again for the purposes of clarity and brevity.

Control command 144 may be sent to network communication manager 120 and may be effective to configure a network element to take an action related to a software defined network. In some examples, control command 144 may be encrypted. Network controller 102 may be effective to send identifier 146 (or a copy of identifier 146) and an activation signal 202 to network elements (such as, for example, network elements 106, 108, 110, 112, 114, and/or 116) through network 104. In various examples, identifier 146 may be encrypted. Activation signal 202 may be, for example, a ping or other control signal effective to determine whether a particular network element is available to receive an identifier. In another example, activation signal 202 may be effective to allow a particular network element to take an action in response to receipt of activation signal 202. For example, activation signal 202 may allow network element 116 to receive identifier 146 (or a copy of identifier 146). To continue the example, identifier 146 and activation signal 202 may be sent to network element 116. In some examples, identifier 146 and activation signal 202 may be first sent to network element 106 which may, in turn, forward or send identifier 146 and activation signal 202 to network element 116. Various other network paths may be used according to a current configuration of network 104 to send identifier 146 and activation signal 202 from network controller 102 to network element 116. In an example, control commands received by network elements 106, 108, 110, 112, 114, and/or 116 which do not include an associated identifier may be ineffective to configure the network elements to take an action related to the software defined network. In various examples, network elements 106, 108, 110, 112, 114, and/or 116 may send identifiers to network communication manager 120 over secure network 150, which may be inaccessible to network 104. For example, access to secure network 150 may require authorization and/or authentication of operator 140. In some examples, secure network 150 may include communication links of low bandwidth as compared to communication links of network 104. For example, an authorized and authenticated operator 140 may direct network controller 102 to send identifier 146 and associated control command 144 to network communication manager 120 over secure network 150.

In response to receipt of activation signal 202, network element 116 may send identifier 146 to network communication manager 120. Identifier 146 may be effective to allow network element 116 to retrieve an associated control command 144. For example, network communication manager 120 may use identifier 146 to perform a lookup of a command associated with identifier 146. In the current example, control command 144 may be associated with identifier 146. Network communication manager 120 may send control command 144 to network element 116. In some examples, network communication manager 120 may send control signal 144 through one or more intervening network elements, according to a current configuration of network 104. Control command 144 may be effective to configure network element 116 to take one or more actions. For example, control command 144 may configure network element 116 to change routing algorithms. In some examples, network elements, such as network elements 106, 108, 110, 112, 114, and/or 116, may be configured such that control commands received directly from a device (and not in response to an activation signal and/or an identifier) may be inoperable to configure the network elements.

Among other benefits, a hacker 230 may be unable to masquerade as a network controller and thereby configure one or more network elements of a software defined network, potentially disrupting service. Hacker 230 may be unable to write to memories of network communication manager 120, as network communication manager 120 may be part of a secure network 150, which may be write protected. Therefore, even if hacker 230 sends a ping and a fake identifier to a network element of network 104, hacker 230 may be unable to send a control command to a network element, as network elements will use the fake identifier to check for associated commands at secure network communication manager 120. In some examples, the fake identifier may not identify a command, as hacker 230 may be unable to write control commands to network communication manager 120.

Figure 3:
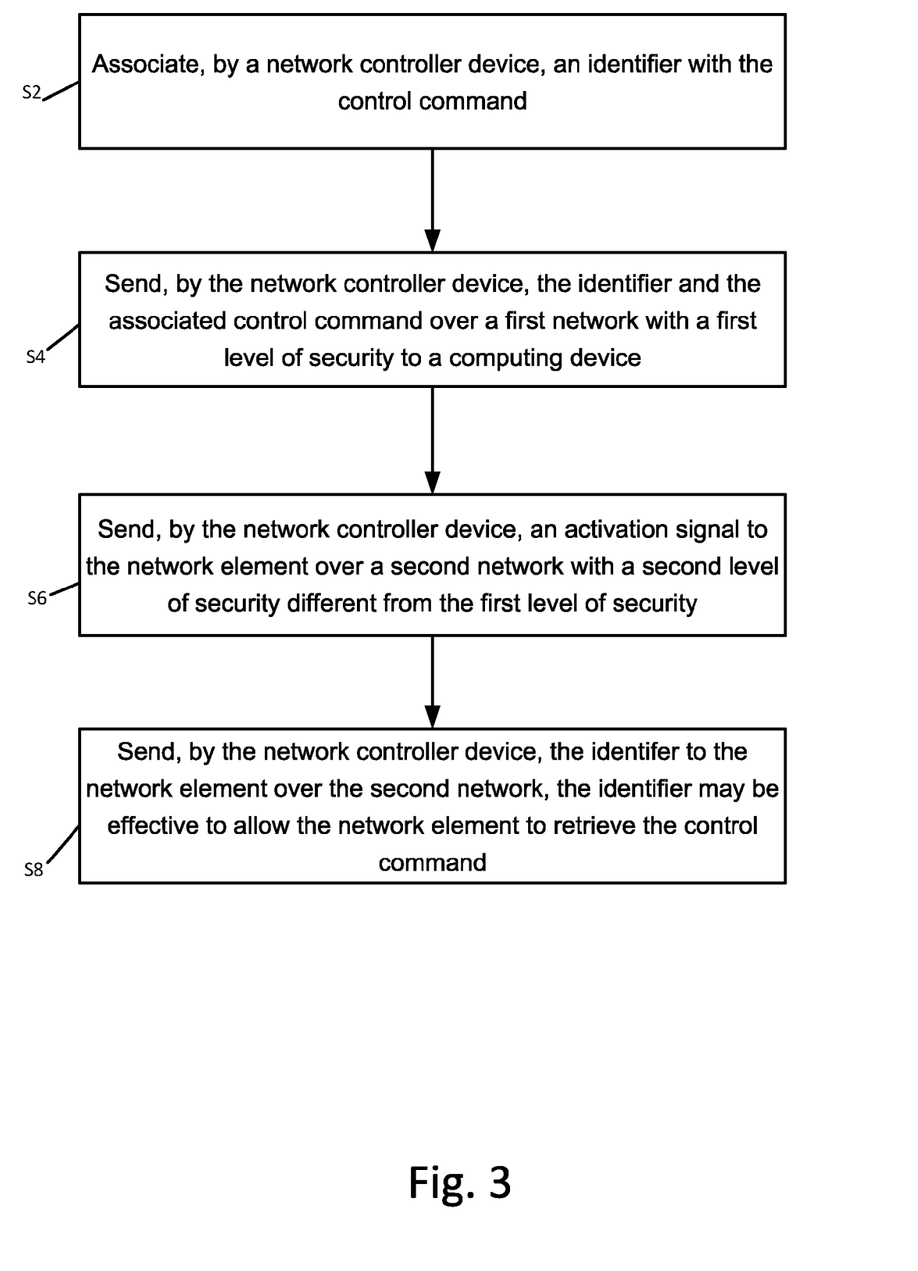
FIG. 3 depicts a flow diagram for an example process to implement network control security.

FIG. 3 depicts a flow diagram for an example process to implement network control security, arranged in accordance with at least some embodiments described herein. In some examples, the process in FIG. 3 could be implemented using system 100 discussed above and could be used to allow for network control security. An example process may include one or more operations, actions, or functions as illustrated by one or more of blocks S2, S4, S6 and/or S8. Although illustrated as discrete blocks, various blocks may be divided into additional blocks, combined into fewer blocks, or eliminated, depending on the desired implementation. In some examples, the process in FIG. 3 may be used by a network controller configured in communication with a network communication manager and one or more network elements.

Processing may begin at block S2, "Associate, by a network controller device, an identifier with the control command." At block S2, a network controller may associate an identifier with the control command. In some examples, the control command may be generated based on one or more programming instructions. In some examples, the programming instructions may be configured to alter a characteristic of a software defined network. In various examples, the control command may be effective to configure the network element to take an action related to a software defined network. In some examples, the action may include changing from a first routing algorithm to a second routing algorithm. In some examples, a network element may receive a control command from a computing device without an associated identifier. When the control command does not include an associated identifier, the control command may be ineffective to configure the network element to take an action related to the network.

Processing may continue from block S2 to block S4, "Send, by the network controller device, the identifier and the associated control command over a first network with a first level of security to a computing device." At block S4, the network controller device may send the identifier and the associated control command to a computing device. In some examples, the identifier and the associated control command may be sent from the network controller device to the computing device over a network with a first level of security. In some examples, first devices that are part of the first network may be privileged to write to a memory of the computing device.

Processing may continue from block S4 to block S6, "Send, by the network controller device, an activation signal to the network element over a second network with a second level of security different from the first level of security." At block S6, the network controller device may send an activation signal to the network element over a second network.

In some examples, the second network may include a second level of security that may be different from the first level of security of the first network. In some examples, the network element may send the identifier to the computing device in response to receipt of the activation signal. In some examples, second devices that are part of the second network may not be privileged to write to the memory of the computing device. In some examples, the activation signal may be a ping effective to determine whether the network element is available to receive the copy of the identifier.

Processing may continue from block S6 to block S8, "Send, by the network controller device, the identifier to the network element over the second network, the identifier may be effective to allow the network element to retrieve the control command." At block S8, the network controller device may send the identifier to the network element over the second network. In some examples, the identifier may be effective to allow the network element to retrieve the control command. In some other examples, the computing device may identify the control command associated with the identifier, in response to receipt of the identifier from the network element. For example, the computing device may be effective to perform a lookup with a copy of the identifier to identify the control command associated with the identifier. The computing device may send the control command to the network element. In some examples, the network controller device, the computing device, and the network element may be arranged in a software defined network.

Figure 4:
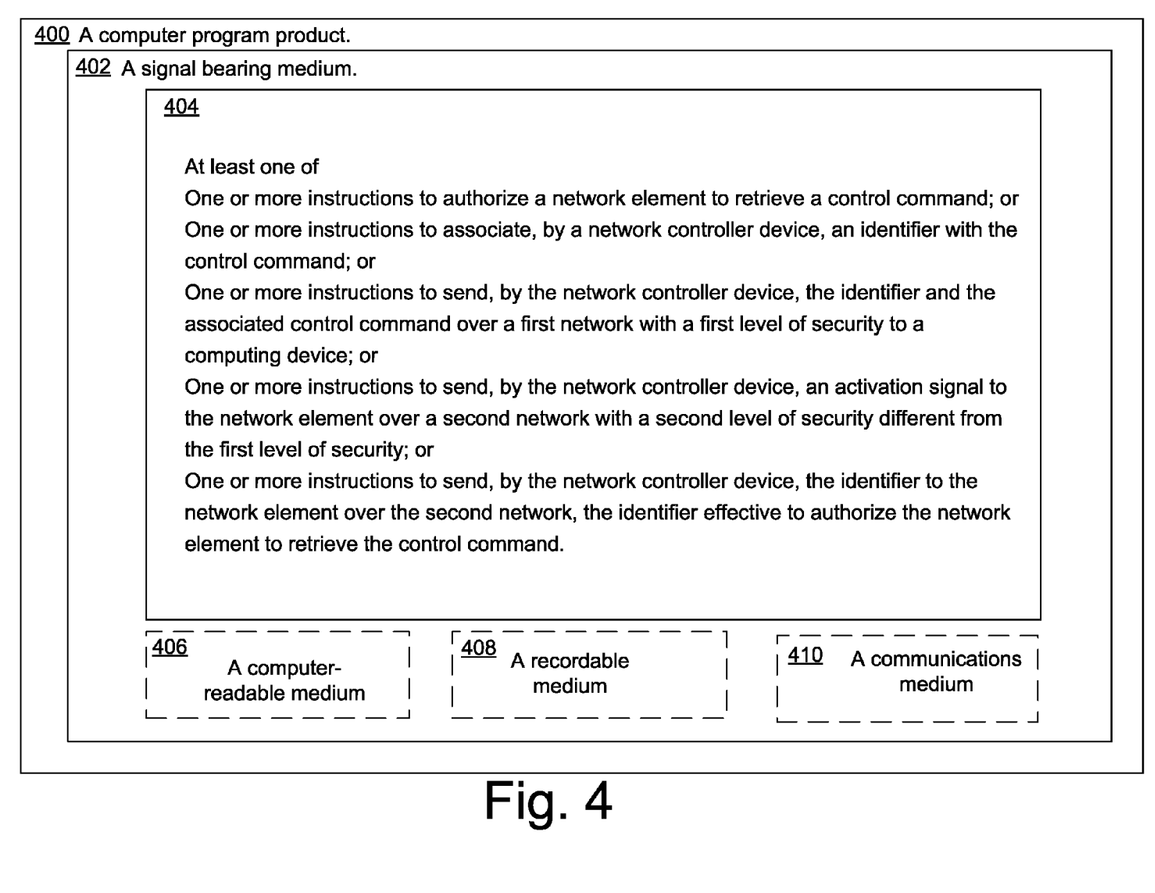
FIG. 4 illustrates an example computer program product that can be utilized to implement network control security.

FIG. 4 illustrates an example computer program product 400 that can be utilized to implement network control security arranged in accordance with at least some embodiments described herein. Computer program product 400 may include a signal bearing medium 402. Signal bearing medium 402 may include one or more instructions 404 that, when executed by, for example, a processor, may provide the functionality described above with respect to FIGS. 1-3. Thus, for example, referring to system 100, network controller 102 and/or network communication manager 120 may undertake one or more of the blocks shown in FIG. 4 in response to instructions 404 conveyed to the system 100 by signal bearing medium 402.

In some implementations, signal bearing medium 402 may encompass a computer-readable medium 406, such as, but not limited to, a hard disk drive, a Compact Disc (CD), a Digital Video Disk (DVD), a digital tape, memory, etc. In some implementations, signal bearing medium 402 may encompass a recordable medium 408, such as, but not limited to, memory, read/write (R/W) CDs, R/W DVDs, etc. In some implementations, signal bearing medium 402 may encompass a communications medium 410, such as, but not limited to, a digital and/or an analog communication medium (e.g., a fiber optic cable, a waveguide, a wired communications link, a wireless communication link, etc.). Thus, for example, computer program product 400 may be conveyed to one or more modules of the system 100 by an RF signal bearing medium 402, where the signal bearing medium 402 is conveyed by a wireless communications medium 410 (e.g., a wireless communications medium conforming with the IEEE 802.11 standard).

Figure 5:
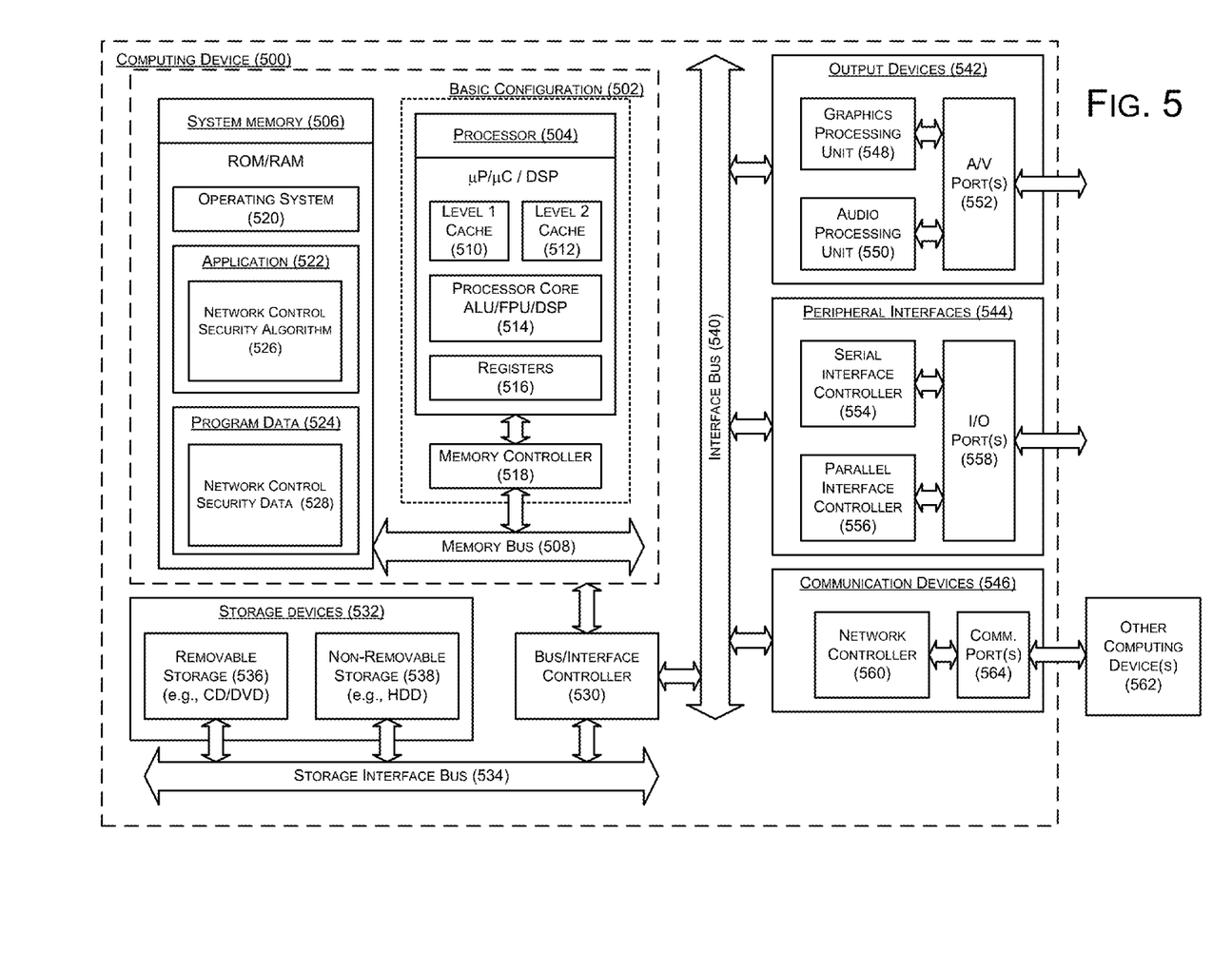
FIG. 5 is a block diagram illustrating an example computing device that is arranged to implement network control security, all arranged according to at least some embodiments described herein.

FIG. 5 is a block diagram illustrating an example computing device 500 that is arranged to implement network control security arranged in accordance with at least some embodiments described herein. In a very basic configuration 502, computing device 500 typically includes one or more processors 504 (such as processor 170) and a system memory 506 (such as memory 172). A memory bus 508 may be used for communicating between processor 504 and system memory 506.

Depending on the desired configuration, processor 504 may be of any type including but not limited to a microprocessor (µP), a microcontroller (µC), a digital signal processor (DSP), or any combination thereof. Processor 504 may include one more levels of caching, such as a level one cache 510 and a level two cache 512, a processor core 514, and registers 516. An example processor core 514 may include an arithmetic logic unit (ALU), a floating point unit (FPU), a digital signal processing core (DSP Core), or any combination thereof. An example memory controller 518 may also be used with processor 504, or in some implementations memory controller 518 may be an internal part of processor 504.

Depending on the desired configuration, system memory 506 may be of any type including but not limited to volatile memory (such as RAM), non-volatile memory (such as ROM, flash memory, etc.) or any combination thereof. System memory 506 may include an operating system 520, one or more applications 522 and program data 524. Application 522 may include a network control security algorithm 526 that is arranged to perform the functions as described herein including those described with respect to system 100 of FIGS. 1-4. Program data 524 may include network control security data 528 that may be useful to implement network control security as is described herein. In some embodiments, application 522 may be arranged to operate with program data 524 on operating system 520 such that network control security may be provided. This described basic configuration 502 is illustrated in FIG. 5 by those components within the inner dashed line.

Computing device 500 may have additional features or functionality, and additional interfaces to facilitate communications between basic configuration 502 and any required devices and interfaces. For example, a bus/interface controller 530 may be used to facilitate communications between basic configuration 502 and one or more data storage devices 532 via a storage interface bus 534. Data storage devices 532 may be removable storage devices 536, non-removable storage devices 538, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 506, removable storage devices 536 and non-removable storage devices 538 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 500. Any such computer storage media may be part of computing device 500.

Computing device 500 may also include an interface bus 540 for facilitating communication from various interface devices (e.g., output devices 542, peripheral interfaces 544, and communication devices 546) to basic configuration 502 via bus/interface controller 530. Example output devices 542 include a graphics processing unit 548 and an audio processing unit 550, which may be configured to communicate to various external devices such as a display or speakers via one or more A/V ports 552. Example peripheral interfaces 544 include a serial interface controller 554 or a parallel interface controller 556, which may be configured to communicate with external devices such as input devices (e.g., keyboard, mouse, pen, voice input device, touch input device, etc.) or other peripheral devices (e.g., printer, scanner, etc.) via one or more I/O ports 558. An example communication device 546 includes a network controller 560, which may be arranged to facilitate communications with one or more other computing devices 562 over a network communication link via one or more communication ports 564.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 500 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 500 may also be implemented as a personal computer including both laptop computer and non-laptop computer configurations.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method to allow a network element to retrieve a control command, the method comprising:
   associating, by a network controller device, an identifier with the control command;
   sending, by the network controller device, the identifier and the associated control command over a first network with a first level of security to a computing device;
   sending, by the network controller device, an activation signal to the network element over a second network with a second level of security different from the first level of security; and
   sending, by the network controller device, the identifier to the network element over the second network, wherein the identifier is effective to allow the network element to retrieve the control command.

2. The method of claim 1, wherein:
   first devices that are part of the first network are privileged to write to a memory of the computing device; and
   second devices that are part of the second network are not privileged to write to the memory of the computing device.

3. The method of claim 1, further comprising:
   sending, by the network element, the identifier to the computing device, in response to receipt of the activation signal.

4. The method of claim 1, wherein the control command is generated based on one or more programming instructions.

5. The method of claim 1, further comprising:
   identifying, by the computing device, the control command associated with the identifier, in response to receipt of the identifier from the network element; and
   sending the control command from the computing device to the network element.

6. The method of claim 1, wherein the control command is effective to configure the network element to take an action related to a software defined network.

7. The method of claim 6, wherein the action includes changing from a first routing algorithm to a second routing algorithm.

8. The method of claim 1, wherein:
   the control command is a first control command, the computing device is a first computing device, and the method further comprises:
   receiving, by the network element, a second control command from a second computing device over the second network, wherein the second control command does not include the identifier.

9. The method of claim 1, wherein the network controller device, the computing device, and the network element are arranged in a software defined network.

10. A network communication system comprising:
    a network controller device;
    a computing device configured to be in communication with the network controller device over a first network with a first level of security; and
    a network element configured to be in communication with the network controller device and the computing device, wherein
    the network controller device is effective to:
    send an identifier and associated control command over the first network to the computing device;
    the computing device effective to store the identifier and the associated control command in a memory of the computing device;
    the network controller device further effective to:
    send an activation signal to the network element over a second network with a second level of security different from the first level of security; and
    send a copy of the identifier to the network element over the second network;
    the network element effective to, in response to receipt of the activation signal, send the copy of the identifier to the computing device; and
    the computing device further effective to, in response to receipt of the copy of the identifier, send the control command associated with the identifier to the network element.

11. The network communication system of claim 10, wherein the network controller device, the computing device, and the network element are arranged in a software defined network.

12. The network communication system of claim 11, wherein the control command is effective to configure the network element to take an action related to the software defined network.

13. The network communication system of claim 10, wherein to send the control command associated with the identifier to the network element, the computing device is further effective to perform a lookup with the copy of the identifier to identify the control command associated with the identifier.

14. The network communication system of claim 10, wherein:
    first devices that are part of the first network are privileged to write to a memory of the computing device; and
    second devices that are part of the second network are not privileged to write to the memory of the computing device.

15. The network communication system of claim 10, wherein:
    the control command is a first control command, the computing device is a first computing device, and the network element is further effective to:
    receive a second control command from a second computing device over the second network, wherein the second control command does not include the identifier.

16. A network controller device, comprising:
    a processor; and
    a memory configured to be in communication with the processor and effective to store one or more instructions, wherein
    the processor effective to, in accordance with the one or more instructions:
    send an identifier and control command over a first network with a first level of security to a computing device;
    send an activation signal to a network element over a second network with a second level of security different from the first level of security; and
    send a copy of the identifier to the network element over the second network, wherein the network element is effective to receive the control command from the computing device.

17. The network controller device of claim 16, wherein the network controller device is further effective to write the control command to a memory of the computing device over the first network.

18. The network controller device of claim 16, wherein:
first devices that are part of the first network are privileged to write to a memory of the computing device; and
second devices that are part of the second network are not privileged to write to the memory of the computing device.

19. The network controller device of claim 16, wherein the activation signal is a ping effective to determine whether the network element is available to receive the copy of the identifier.

20. The network controller device of claim 16, wherein the control command is generated based on one or more programming instructions configured to alter a characteristic of a software defined network.

* * * * *